(No Model.)
M. McMAHON.
GRAIN SCOURER.
No. 331,074. Patented Nov. 24, 1885.
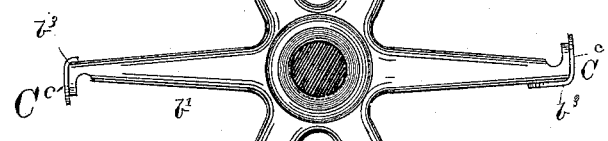
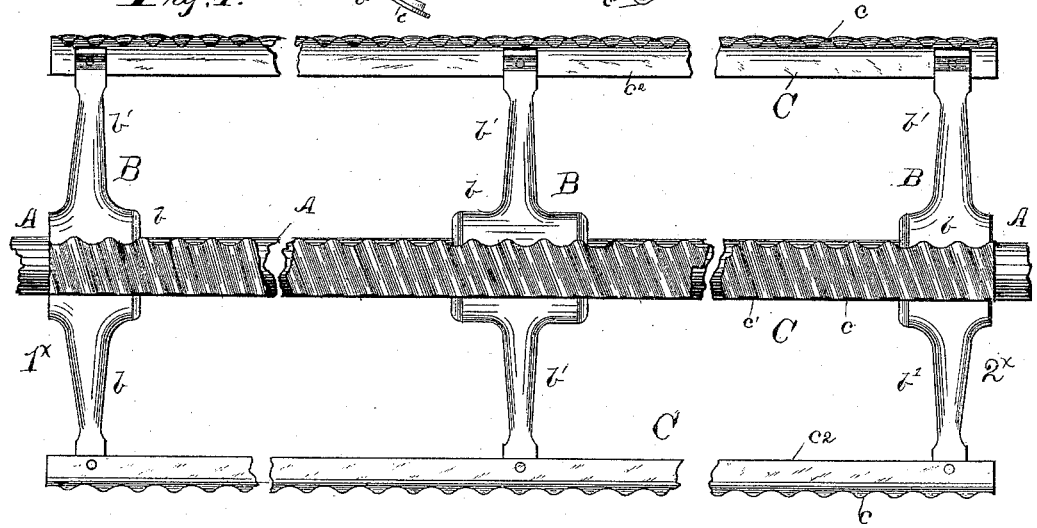
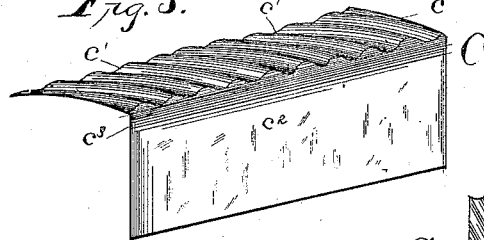
Witnesses:
T. F. Holden
Jas. H. Lange
Inventor
Michael McMahon
per Hallock & Hallock
Attys

UNITED STATES PATENT OFFICE.

MICHAEL McMAHON, OF BUCYRUS, OHIO.

GRAIN-SCOURER.

SPECIFICATION forming part of Letters Patent No. 331,074, dated November 24, 1885.

Application filed February 4, 1885. Serial No. 154,908. (No model.)

*To all whom it may concern:*

Be it known that I, MICHAEL MCMAHON, a citizen of the United States, residing at Bucyrus, in the county of Crawford and State of Ohio, have invented certain new and useful Improvements in Grain-Scourers; and I do hereby declare the following to be a full, clear, and exact description of the invention, such as will enable others skilled in the art to which it appertains to make and use the same.

My invention relates, generally, to that class of scourers which are provided with blades for rubbing the grain against the cylinders, and particularly to the blades and their construction.

The nature of the invention will more fully appear from the subjoined description, and the novelty will be pointed out in the claims.

Referring to the drawings, Figure 1 represents a longitudinal elevation of the shaft and spiders having my improved blades attached thereto. Fig. 2 is an end elevation of the parts shown in Fig. 1, the shaft being in section. Fig. 3 is a part of a blade, shown in perspective. Fig. 4 is an elevation showing a part of a blade slightly modified.

A represents the shaft, B the spiders, and C the blades. The shaft is of the kind ordinarily used, and is journaled in the usual manner. The spiders are provided with hubs $b$ and arms $b'$, to which the blades are attached. The hubs $b$ are fixed to the shaft in any suitable or well-known manner. The blades C are provided with corrugated faces $c$, of the same curvature as the cylinder in which they are to be placed. The corrugations form grooves $c'$, large enough to admit grains of wheat. These grooves $c'$ are preferably formed diagonally of the length of the blades, so that the grain entering the forward ends of the grooves will pass out at points back of the places where it entered. As it is designed to have the front ends of the grooves extend toward the point where the grain enters the scourer, it will be readily seen that the tendency of the blades will be to force the grain toward the exit end. The numeral $1^\times$ indicates the end at which the grain would enter, and the numeral $2^\times$ indicates the end at which it would make its exit. Each blade is provided with a flange, $c^2$, which I term the "front face" of the blade, and it is of the same length as the corrugated face, so that they will mutually support or stiffen each other. The flanges $c^2$ also serve as beaters, and guide the grain to the grooves.

The best manner of forming the blades is as follows: Take a plate of sufficient width to form the faces $c$ and $c^2$, and corrugate it diagonally from end to end. The plate is then bent at an angle to form the faces $c$ and $c^2$, which are connected by the bent part $c^3$, of sufficient curvature to permit the grain to enter the diagonal grooves. The grooves may be left upon the front face, $c^2$, as shown in Fig. 4, or they may be rolled, so as to present a plane face. The corrugations should, however, be rolled in such a manner as not to lengthen the face $c^2$. The ends $b^2$ of the spider-arms are rounded, so as to be of the same curvature as the corrugated faces $c$, and the parts $b^3$ are rounded to the bent parts $c^3$.

The operation of the scourer is the same as any other, and need not be described.

In practice every other blade in the series, as shown in Fig. 2, may consist of the corrugated face $c$ alone, while the remaining blades in that series will also have the faces $c^2$.

I am aware that bent plates supported by bars extending the whole length of the plates are old, and that bars having attached to their upper sides plates provided with diagonal grooves upon their upper or rubbing faces are old, and these I do not claim, as my device differs from them, in that my bent plates are corrugated diagonally, which stiffens the plates to such an extent that the supporting-bars are unnecessary.

What I claim as new is—

1. In a grain-scourer, the shaft and spiders, in combination with the blades attached directly to the spiders, said blades having their rubbing-faces corrugated diagonally, and provided with flanges forming their front faces, and connected to the rubbing-faces by the bent parts $c^3$, substantially as described.

2. In a grain-scourer, the combination of the shaft and spiders with the sheet-metal blades, the latter being attached directly to the spiders, and having their rubbing-faces and flanges corrugated diagonally, and the bent parts $c^3$, substantially as described.

In testimony whereof I affix my signature in presence of two witnesses.

MICHAEL McMAHON.

Witnesses:
WILLIAM N. SHARPNACK,
F. S. MOURNETT.